US008786637B2

(12) United States Patent
Song et al.

(10) Patent No.: US 8,786,637 B2
(45) Date of Patent: Jul. 22, 2014

(54) METHOD FOR PROCESSING IMAGE AND DEVICES USING THE METHOD

(75) Inventors: Min-Woo Song, Seoul (KR); Jong Ho Roh, Yongin-si (KR); Byoung Jin Ahn, Suwon-si (KR); Ho June Leu, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 191 days.

(21) Appl. No.: 13/426,796

(22) Filed: Mar. 22, 2012

(65) Prior Publication Data

US 2012/0242707 A1 Sep. 27, 2012

(30) Foreign Application Priority Data

Mar. 23, 2011 (KR) ........................ 10-2011-0025712

(51) Int. Cl.
*G06T 5/00* (2006.01)

(52) U.S. Cl.
USPC ............................ 345/660; 345/629; 348/452

(58) Field of Classification Search
USPC ............................ 345/660
See application file for complete search history.

(56) References Cited

U.S. PATENT DOCUMENTS

| | | | | |
|---|---|---|---|---|
| 7,391,933 | B2 | 6/2008 | Wang et al. | |
| 8,497,881 | B2 * | 7/2013 | Roh et al. | 345/660 |
| 2005/0162566 | A1 * | 7/2005 | Chuang et al. | 348/714 |
| 2006/0274089 | A1 * | 12/2006 | Zhu et al. | 345/660 |
| 2007/0041662 | A1 * | 2/2007 | Jeffrey | 382/298 |
| 2007/0104394 | A1 * | 5/2007 | Chou | 382/300 |
| 2007/0292113 | A1 * | 12/2007 | Tsou et al. | 386/95 |
| 2008/0291332 | A1 | 11/2008 | Messing et al. | |
| 2009/0295834 | A1 * | 12/2009 | MacInnis et al. | 345/660 |
| 2010/0111195 | A1 * | 5/2010 | Fortin | 375/240.26 |
| 2010/0172599 | A1 * | 7/2010 | Choi | 382/298 |
| 2012/0127193 | A1 * | 5/2012 | Bratt et al. | 345/590 |

FOREIGN PATENT DOCUMENTS

| | | |
|---|---|---|
| JP | 2007-193397 | 8/2007 |
| JP | 2008-176795 | 7/2008 |
| KR | 20050041849 | 5/2005 |

* cited by examiner

*Primary Examiner* — M Good Johnson
(74) *Attorney, Agent, or Firm* — Volentine & Whitt, PLLC

(57) ABSTRACT

A scaler is provided and includes filters each receiving input pixel data and scaling the input pixel data using a scaling factor to generate a scaled pixel value, and a plurality of mixers, less than the plurality of filters. A first mixer performs a first blending operation on a first scaled pixel value and a second scaled pixel value provided by different filters. A second mixer performs a second blending operation on the blended result of the first mixer and a third scaled pixel value provided by anther filter.

18 Claims, 5 Drawing Sheets

METHOD FOR PROCESSING IMAGE AND DEVICES USING THE METHOD

CROSS-REFERENCE TO RELATED APPLICATIONS

A claim of priority under 35 U.S.C. §119(a) is made to Korean Patent Application No. 10-2011-0025712, filed on Mar. 23, 2011, the subject matter of which is hereby incorporated by reference.

BACKGROUND

Embodiments of the present inventive concept relate to a method for processing an image, and more particularly, to an image processing method that may improve image characteristics and to devices performing the method.

In an image processing system, a source image includes a collection of original image pixels. A display device displays a destination image. Image pixels of the destination image may not properly correspond to the original image pixels.

When the image pixels of the destination image do not correspond to the original image pixels, a scaling operation is required such that the original image pixels properly correspond to the image pixels. Unfortunately, the quality of a source image may be degraded by application of the scaling operation.

SUMMARY OF THE INVENTION

Certain embodiments of the inventive concept provide image processing methods that use a plurality of filters to improve an image. Other embodiments of the inventive concept provide devices that use the foregoing method.

One embodiment of the inventive concept provides a scaler comprising: a plurality of filters, each receiving input pixel data and scaling the input pixel data using a scaling factor to generate a scaled pixel value, and a plurality of mixers, less than the plurality of filters, wherein a first mixer among the plurality of mixers performs a first blending operation on a first scaled pixel value provided by a first filter among the plurality of filters and a second scaled pixel value provided by a second filter among the plurality of filters to generate a first blended result value, and a second mixer among the plurality of mixers performs a second blending operation on the first blended result value provide by the first mixer and a third scaled pixel value provided by a third filter among the plurality of filters to generate a second blended result value, the second blended result value being output by the scaler as output pixel data corresponding to the input pixel data.

Another embodiment of the inventive concept provides an image processing system comprising; a scaler that provides output pixel data and a display that displays an image corresponding to the output pixel data, wherein the scaler comprises; a plurality of filters, each receiving input pixel data and scaling the input pixel data using a scaling factor to generate a scaled pixel value, and a plurality of mixers, less than the plurality of filters, wherein a first mixer among the plurality of mixers performs a first blending operation on a first scaled pixel value provided by a first filter among the plurality of filters and a second scaled pixel value provided by a second filter among the plurality of filters to generate a first blended result value, and a second mixer among the plurality of mixers performs a second blending operation on the first blended result value provide by the first mixer and a third scaled pixel value provided by a third filter among the plurality of filters to generate a second blended result value, the second blended result value being output by the scaler as the output pixel data and corresponding to the input pixel data.

Another embodiment of the inventive concept provides an image scaler system comprising; a first image scaler that receives a source image and generates a corresponding partially scaled source image by scaling input pixel data from of the source image; and a second image scaler that receives the partially scaled source image and generates a corresponding destination image by scaling input pixel data from the partially scaled source image. At least one of the first image scaler and the second image scaler comprises; a plurality of filters, each receiving the input pixel data and scaling the input pixel data using a scaling factor to generate a scaled pixel value, and a plurality of mixers, less than the plurality of filters, wherein a first mixer among the plurality of mixers performs a first blending operation on a first scaled pixel value provided by a first filter among the plurality of filters and a second scaled pixel value provided by a second filter among the plurality of filters to generate a first blended result value, and a second mixer among the plurality of mixers performs a second blending operation on the first blended result value provide by the first mixer and a third scaled pixel value provided by a third filter among the plurality of filters to generate a second blended result value, the second blended result value being output by the scaler as output pixel data corresponding to the input pixel data.

BRIEF DESCRIPTION OF THE DRAWINGS

These and/or other aspects and advantages of the inventive concept will become apparent and more readily appreciated from the following description of the embodiments taken in conjunction with the accompanying drawings of which.

DETAILED DESCRIPTION OF EMBODIMENTS

Embodiments of the inventive concept will now be described in some additional detail with reference to the accompanying drawings. The inventive concept may, however, be embodied in many different forms and should not be construed as being limited to only the illustrated embodiments. Rather, these embodiments are provided so that this disclosure will be thorough and complete. Throughout the written description and drawings, like reference numbers and labels are used to denote like or similar elements.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting. As used herein, the singular forms “a”, “an” and “the” are intended to include the plural forms as well, unless the context clearly indicates otherwise. It will be further understood that the terms “comprises” and/or “comprising,” or “includes” and/or “including” when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which the exemplary embodiments belong. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

Figure 1:
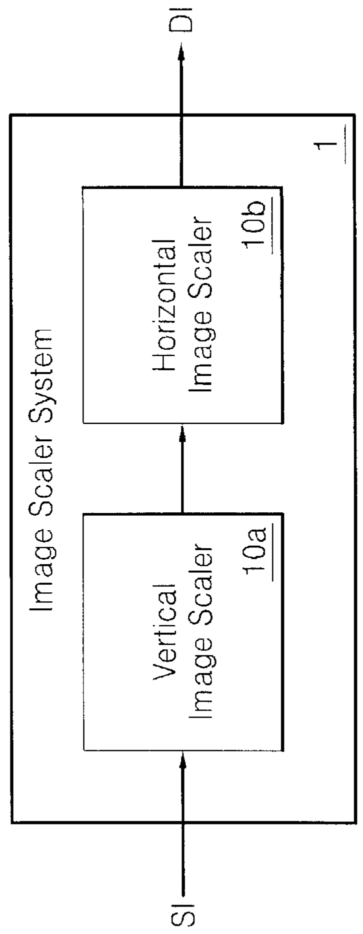
FIG. 1 is a block diagram of an image scaler system according to an embodiment of the inventive concept.

FIG. 1 is a block diagram of an image scaler system according to an embodiment of the inventive concept. Referring to FIG. 1, an image scaler system 1 outputs a destination image DI after resizing a source image SI.

The source image SI and the destination image DI are component images. That is, the source image SI and the destination image DI may be images formed using pixels that are red, green, or blue in color. In one possible embodiment, the source image SI and the destination image DI are images including a Y value (a luminance component), and a U value and/or a V value (i.e., chrominance components).

The image scaler system 1 generally comprises two (2) series connected image scalers 10*a* and 10*b*. Vertical image scaling is performed by a (first) vertical image scaler 10*a* and horizontal image scaling is performed by a (second) horizontal image scaler 10*b*. According to the illustrated embodiment, the order of the vertical/horizontal scaling may be reversed as a matter of design choice.

Figure 2:
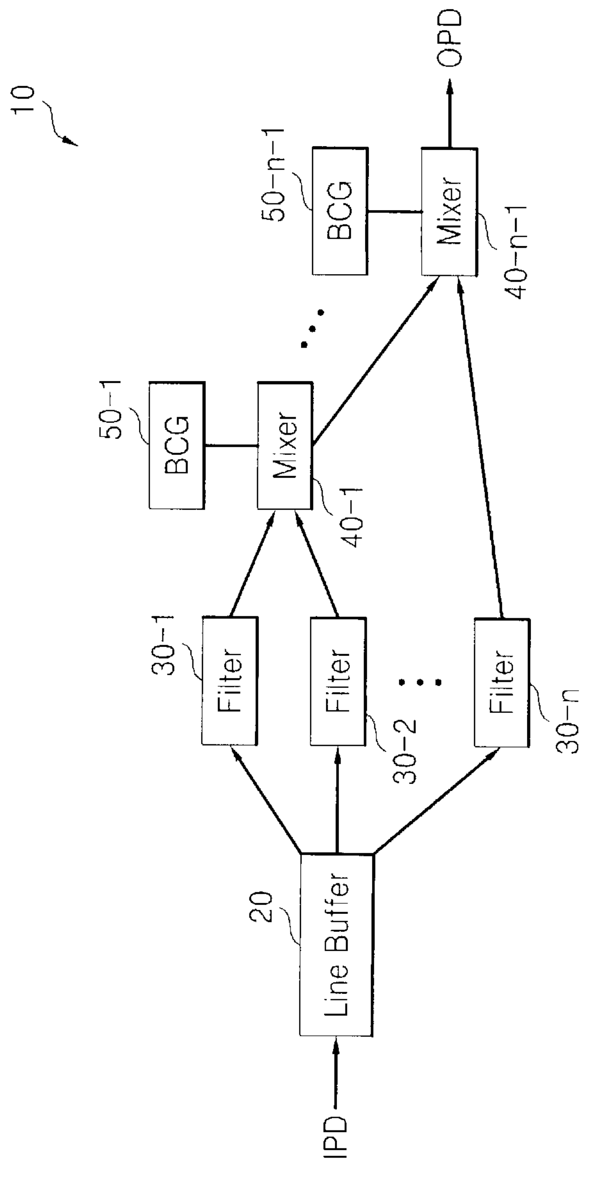
FIG. 2 is a block diagram further illustrating the image scaler of FIG. 1.

FIG. 2 is a block diagram further and more generically illustrating either one or both of the vertical and horizontal scalers shown in FIG. 1. Referring to FIGS. 1 and 2, an image scaler 10 comprises a line buffer 20, a plurality of filters 30-1, 30-2, . . . , and 30-*n*−1, and a plurality of mixers 40-1, . . . , and 40-*n*−1. The line buffer 20 stores input pixel data IPD.

The input pixel data IPD may be an “original source image” (i.e., source image SI before any scaling) or a “partially scaled source image” received from a previous image scaler (e.g., the vertical image scaler 10*a* in the context of the horizontal scaler of FIG. 1). The input pixel data IPD will typically include at least one pixel line. For example, the input pixel data IPD may be a pixel line including a red color to scale a vertical image or a horizontal image.

Each of the plurality of filters 30-1, 30-2, . . . , and 30-*n* receives the input pixel data IPD output from the line buffer 20 either in serial or in parallel, and then scales the input pixel data IPD according to a defined scaling factor. Each of the plurality of filters 30-1, 30-2, . . . , and 30-*n* may be used to scale the input pixel data IPD in a different way by selecting different filter coefficients. For example, a filter 30-1 may scale the input pixel data IPD as improving sharpness by selecting filter coefficients that improve sharpness.

A filter 30-2 may scale the input pixel data IPD as performing noise blurring on pixel data by selecting filter coefficients that compensate for noise blurring. Any defined scaling factor may be understood as a ratio between a number of pixels of the destination image DI and a number of pixels of the source image SI.

For example, the scaling factor applied in the horizontal direction may be expressed as (Sx=Xd/Xs), and the scaling factor applied in the vertical direction may be expressed as (Sy=Yd/Ys), where Xs is the size of the source image SI in the horizontal direction, Ys is the size of the source image SI in the vertical direction, Xd is the size of a destination image DI in the horizontal direction, and Yd is the size of the destination image in the vertical direction.

Figure 3:
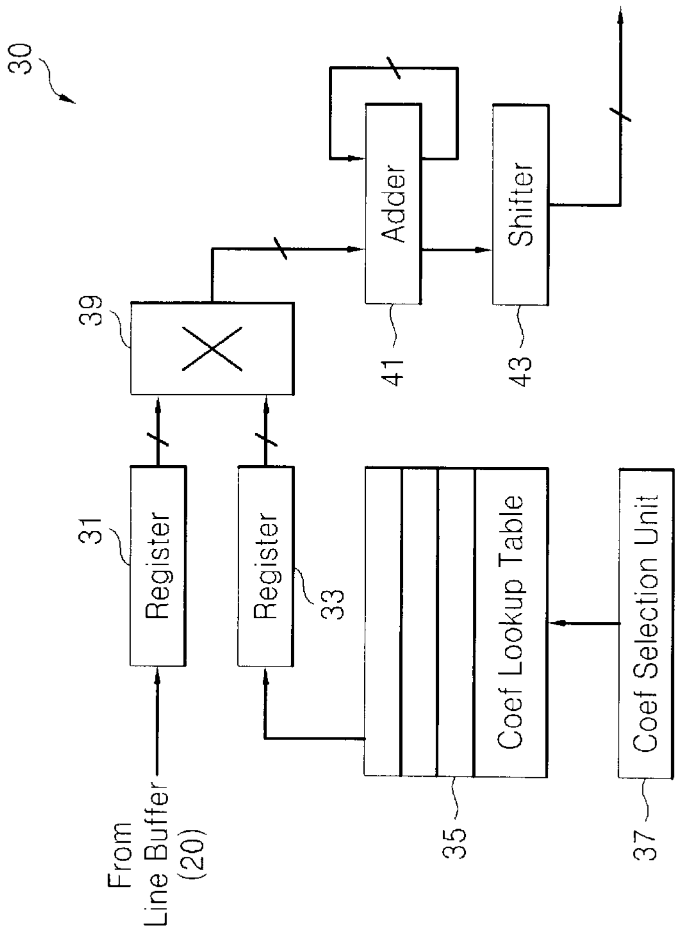
FIG. 3 is a block diagram further illustrated one possible embodiment of the filter(s) in FIG. 2.

FIG. 3 is a block diagram further illustrating one possible embodiment for the filter(s) shown in FIG. 2. Referring to FIGS. 1, 2 and 3, a filter 30 may be used as one or more of the plurality of filters 30-1, 30-2, . . . , and 30-*n* shown in FIG. 2. In the particular embodiment of FIG. 3, the filter 30 is assumed to be a finite impulse response (FIR) filter. As such, the filter 30 comprises a first register 31 and a second register 33, a coefficient look-up table 35, a coefficient selection unit 37, a multiplier 39, an adder 41 and a shifter 43.

The first register 31 may be used to store the input pixel data IPD received from the line buffer 20. The second register 33 may be used to store coefficients selected by a coefficient selection unit 37 from the coefficient loop-up table 35. The coefficient look-up table 35 may be used to store a plurality of coefficients.

With this configuration, the coefficient selection unit 37 may select from the plurality of coefficients stored in the coefficient look-up table 35 to (e.g.,) improve sharpness of the source image SI or to compensate for noise blurring of the source image SI.

The multiplier 39 receives and multiplies the input pixel data IPD provided by the first register 31 with selected coefficients provided by the second register 33. When both the input pixel data IPD received from the first register 31 and the selected coefficients received from the second register 33 are respectively assumed to be 16 bits in length, the output value provided by the multiplier 39 will be 32 bits. The adder 41 then adds the output value provided by the multiplier 39 to a previous sum. That is, the output of the adder 41 is feedback to the input of the adder 41.

The shifter 43 then scales the output value provided by the adder 41 for normalization. For example, in certain embodiments the filter output value provided by the shifter 43 may be 8 bits. This filter output value (i.e., scaled pixel data) provide by the shifter 43 is then applied to one or more mixers (e.g., 40-1 in the illustrated example of FIG. 2).

In other embodiments of the inventive concept, the filter 30 may be embodied as a polyphase filter or a cubic filter to reduce calculation load. However, those skilled in the art will recognize that many different types of filters may be used in different embodiments of the inventive concept.

Referring back to FIG. 2, the mixer 40-1 performs a blending operation on the scaled pixel data provided from one or more of the plurality of filter 30-1 and 30-2 using, for example, an approach like the one given by ($C=A\alpha+B(1-\alpha)$), where “C” is a blending result value, “A” is first scaled pixel data output from the filter 30-1, “B” is second pixel data output from the filter 30-2, and “$\alpha$” is a coefficient having a range of between 0 and 1. This type of blending operation is known as an alpha blending, but other blending operations may be used as a matter of design choice.

The mixer 40-1 may supply better-definition output pixel data OPD by blending pixel data output from each of the plurality of filters 30-1 and 30-2. The output pixel data OPD may be destination image DI or partial source image provided by (e.g.,) the vertical image scaler 10*a* of FIG. 1. A blending coefficient generator (BCG) 50-1 may be used to generate the coefficient "a" according to an edge or noise of pixel data output from the plurality of filters 30-1 and 30-2.

A blending value output from the mixer 40-1 may be used as an input to another mixer 40-*n*−1. The mixer 40-*n*−1 may blend a blending value output from the mixer 40-1 with scaled pixel data output from a filter 30-*n* by using, for example, an approach like the one given by (E=Cβ+D(1−β)), where "E" is a blending result value, "C" is pixel data output from the mixer 40-1, the "D" is pixel data output from the filter 30-*n*, and "β" is a coefficient, having a range of between 0 and 1.

In a manner similar to that previously described, a blending coefficient generator 50-*n*−1 may be used to generate coefficients for the blending operation performed by the mixer 40-*n*−1.

Only two mixers 40-1 and 40-*n*−1 and two blending coefficient generators 50-1 and 50-*n*−1 are illustrated in FIG. 2 for convenience of explanation. However, those skilled in the art will recognize that any reasonable number of mixers and blending coefficient generators may be used in certain embodiments of the inventive concept.

Figure 4:
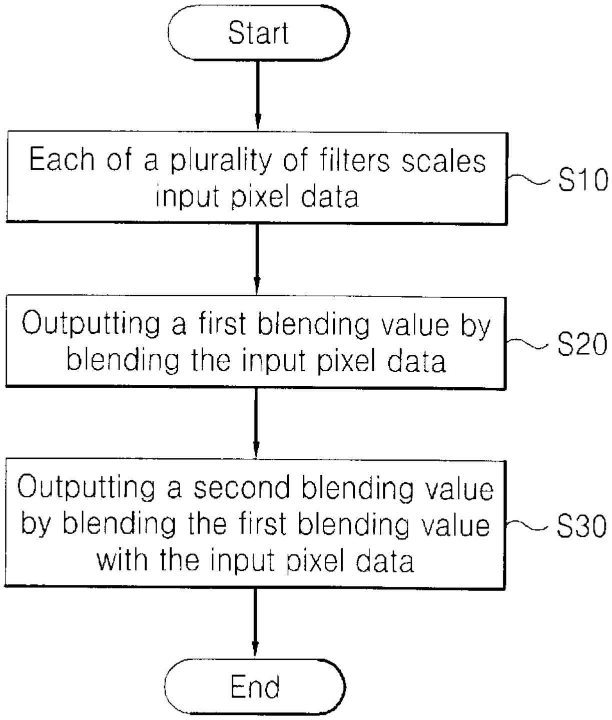
FIG. 4 is a flowchart summarizing a scaling method according to an embodiment of the inventive concept.

FIG. 4 is a flowchart summarizing a scaling operation according to an embodiment of the inventive concept. Referring to FIGS. 1 through 4, each of the plurality of filters 30-1, 30-2, . . . , and 30-*n* receives input pixel data IPD and scales the input pixel data IPD using a scaling factor (S10).

Them, the mixer 40-1 outputs a first blending value by blending scaled input pixel data output from each of the plurality of filters 30-1 and 30-2 (S20). The term "first blending value" is used to denote means scaled pixel data. A mixer 40-*n*−1 then outputs a second blending value by blending the first blending value with scaled input pixel data output from a filter 30-*n* (S30). The term "second blending value" is used to denote the output pixel data OPD in the context of the embodiment shown in FIG. 2. Accordingly, the scaler 10 of FIG. 2 may improve the quality of the resulting output pixel data OPD using the plurality of filters 30-1, 30-2, . . . , and 30-*n* and the plurality of mixers 40-1, . . . , and 40-*n*−1.

Figure 5:
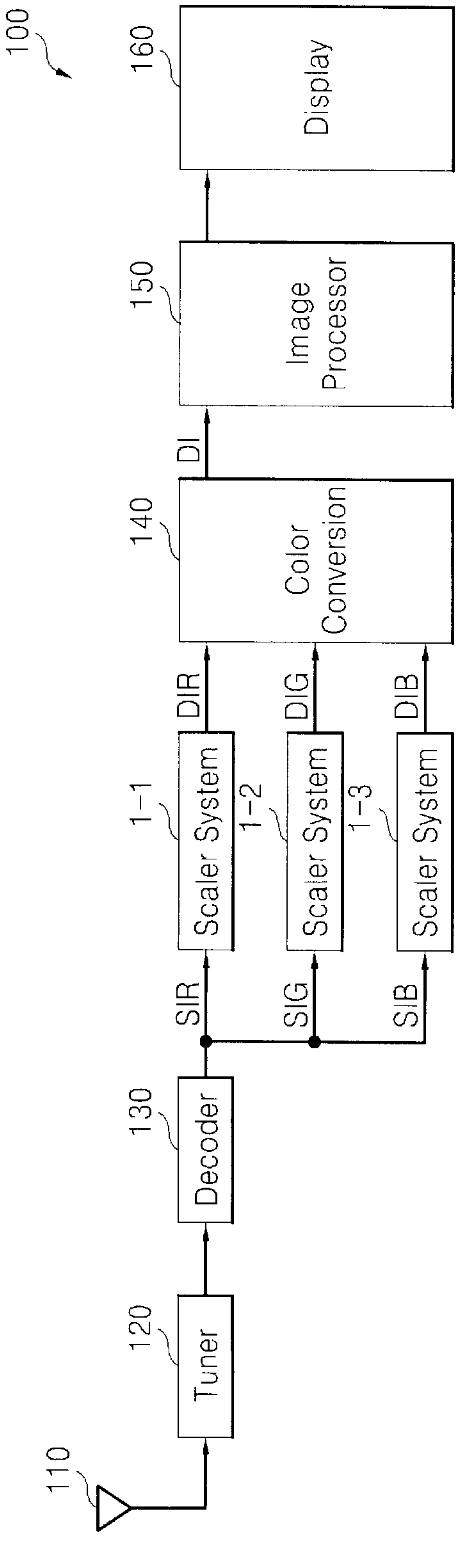
FIG. 5 is a block diagram of an image processing system according to an embodiment of the inventive concept.

FIG. 5 is a block diagram of an image processing system according to an embodiment of the inventive concept. Referring to FIGS. 1 through 5, an image processing system 100 may be used in a system performing an image signal process. For example, the image processing system 100 may be embodied in a digital camera, a lap-top computer, a cellular phone, a MP3 player, a tablet PC or a TV.

When the image processing system 100 is embodied in a TV, the image processing system 100 may include an antenna 110, a tuner 120, a decoder 130, a plurality of scaler systems 1-*n*, an image processor 150 and a display 160. The image processing system 100 receives a plurality of channel signals through an antenna 110 and receives a channel signal selected by a tuner 120. A decoder 130 decodes a selected channel signal and outputs a source image SI.

The source image SI includes pixel data comprising a red color, a green color or a blue color for scaling a vertical image and a horizontal image. For example, a scaler system 1-1 scales a source image SIR including a red color and outputs a destination image DIR including the red color.

A scaler system 1-2 scales a source image SIG including a green color and outputs a destination image DIG including the green color. A scaler system 1-3 scales a source image SIB including a blue color and outputs a destination image DIB including the blue color. Each of the plurality of scaler systems 1-1, 1-2 and 1-3 depicts an example embodiment of the scaler system 1 illustrated in FIG. 1.

As noted above, in certain embodiments, a source image SI may include a Y value, a U value and a V value for scaling a vertical image and a horizontal image.

When a destination image is expressed the Y value, the U value and the V value, the image processing system 100 may include a color conversion 140 to convert each of the destination image DIR including a red color, the destination image DIG including a green color and the destination image DIB including a blue color into the Y value, the U value and the V value.

The image processor 150 processes various operations such as gamma correction. A display 160 displays a destination image DI processed by the image processor 150.

An image processing method according to an embodiment of the inventive concept and devices performing the method may improve an image using a plurality of filters.

Although certain embodiments of the inventive concept have been shown and described, it will be appreciated by those skilled in the art that changes may be made in these embodiments without departing from the scope of the inventive concept as defined in the appended claims and their equivalents.

What is claimed is:

1. A scaler comprising:

a plurality of filters, each receiving input pixel data and scaling the input pixel data using a scaling factor to generate a scaled pixel value; and a plurality of mixers, less than the plurality of filters, wherein a first mixer among the plurality of mixers performs a first blending operation comprising multiplying a first scaled pixel value provided by a first filter among the plurality of filters and a second scaled pixel value provided by a second filter among the plurality of filters by a first blending coefficient to generate a first blended result value, and a second mixer among the plurality of mixers performs a second blending operation comprising multiplying the first blended result value provided by the first mixer and a third scaled pixel value provided by a third filter among the plurality of filters by a second blending coefficient to generate a second blended result value, the second blended result value being output by the scaler as output pixel data corresponding to the input pixel data.

2. The scaler of claim 1, further comprising:

a first blending coefficient generator (BCG) that generates the first blending coefficient for the first mixer; and a second BCG that generates the second blending coefficient for the second mixer.

3. The scaler of claim 1, wherein the first filter comprises:

a coefficient selection unit that selects a first filter coefficient from a coefficient look-up table; and a multiplier that receives and multiples first input pixel data received by the first filter with the first filter coefficient.

4. The scaler of claim 3, wherein the first filter further comprises:

an adder that receives an output value from the multiplier and recursively adds the output value of the multiplier to a previous sum; and a shifter that receives an output value from the adder and scales the output value of the adder for normalization to generate the first scaled pixel data.

5. The scaler of claim 1, wherein the first filter coefficient compensates for noise blurring in the first input pixel data.

6. The scaler of claim 1, wherein the second filter coefficient improves sharpness of the second input pixel data.

7. The scaler of claim 1, wherein the first mixer performs the first blending operation using an alpha blending method, and the second mixer performs the second blending operation using the alpha blending method.

8. The scaler of claim 1, wherein at least one the first and second filters is a polyphase filter or a cubic filter.

9. The scaler of claim 1, further comprising a line buffer that receives and stores the first input pixel data and the second input pixel data.

10. An image processing system comprising:

a scaler that provides output pixel data and a display that displays an image corresponding to the output pixel data, wherein the scaler comprises:

a plurality of filters, each receiving input pixel data and scaling the input pixel data using a scaling factor to generate a scaled pixel value; and a plurality of mixers, less than the plurality of filters, wherein a first mixer among the plurality of mixers performs a first blending operation comprising multiplying a first scaled pixel value provided by a first filter among the plurality of filters and a second scaled pixel value provided by a second filter among the plurality of filters by a first blending coefficient to generate a first blended result value, and a second mixer among the plurality of mixers performs a second blending operation comprising multiplying the first blended result value provided by the first mixer and a third scaled pixel value provided by a third filter among the plurality of filters by a second blending coefficient to generate a second blended result value, the second blended result value being output by the scaler as the output pixel data and corresponding to the input pixel data.

11. The image processing system of claim 10, wherein the scaler further comprises:

a first blending coefficient generator (BCG) that generates the first blending coefficient for the first mixer; and a second BCG that generates the second blending coefficient for the second mixer.

12. The image processing system of claim 10, wherein the first filter comprises:

a coefficient selection unit that selects a first filter coefficient from a coefficient look-up table; and a multiplier that receives and multiples first input pixel data received by the first filter with the first filter coefficient.

13. The image processing system of claim 12, wherein the first filter further comprises:

an adder that receives an output value from the multiplier and recursively adds the output value of the multiplier to a previous sum; and a shifter that receives an output value from the adder and scales the output value of the adder for normalization to generate the first scaled pixel data.

14. The image processing system of claim 13, wherein the first filter coefficient compensates for noise blurring in the first input pixel data or improves sharpness of the second input pixel data.

15. The image processing system of claim 10, wherein the first mixer performs the first blending operation using an alpha blending method, and the second mixer performs the second blending operation using the alpha blending method.

16. An image scaler system comprising:

a first image scaler that receives a source image and generates a corresponding partially scaled source image by scaling input pixel data from of the source image; and a second image scaler that receives the partially scaled source image and generates a corresponding destination image by scaling input pixel data from the partially scaled source image, wherein at least one of the first image scaler and the second image scaler comprises:

a plurality of filters, each receiving the input pixel data and scaling the input pixel data using a scaling factor to generate a scaled pixel value; and a plurality of mixers, less than the plurality of filters, wherein a first mixer among the plurality of mixers performs a first blending operation comprising multiplying a first scaled pixel value provided by a first filter among the plurality of filters and a second scaled pixel value provided by a second filter among the plurality of filters by a first blending coefficient to generate a first blended result value, and a second mixer among the plurality of mixers performs a second blending operation comprising multiplying the first blended result value provided by the first mixer and a third scaled pixel value provided by a third filter among the plurality of filters by a second blending coefficient to generate a second blended result value, the second blended result value being output by the scaler as output pixel data corresponding to the input pixel data.

17. The image scaler system of claim 16, wherein the first image scaler is a vertical image scaler, and the second image scaler is a horizontal image scaler.

18. The image scaler system of claim 16, wherein the first image scaler is a horizontal image scaler, and the second image scaler is a vertical image scaler.

* * * * *